（12）United States Patent
McDermid

(10) Patent No.: US 8,810,536 B2
(45) Date of Patent: Aug. 19, 2014

(54) TABLET COMPUTER INPUT DEVICE

(76) Inventor: William James McDermid, Longmont, CO (US)

( * ) Notice: Subject to any disclaimer, the term of this patent is extended or adjusted under 35 U.S.C. 154(b) by 172 days.

(21) Appl. No.: 13/287,803

(22) Filed: Nov. 2, 2011

(65) Prior Publication Data

US 2012/0113034 A1  May 10, 2012

Related U.S. Application Data

(60) Provisional application No. 61/410,357, filed on Nov. 5, 2010.

(51) Int. Cl.
*G06F 3/041* (2006.01)
*G06F 3/0489* (2013.01)
*G06F 3/02* (2006.01)
*G06F 3/0485* (2013.01)
*G06F 1/16* (2006.01)
*G06F 3/0338* (2013.01)
*G06F 3/038* (2013.01)

(52) U.S. Cl.
CPC .......... *G06F 3/04892* (2013.01); *G06F 3/0219* (2013.01); *G06F 3/0489* (2013.01); *G06F 3/0485* (2013.01); *G06F 1/1632* (2013.01); *G06F 3/0338* (2013.01); *G06F 1/1626* (2013.01); *G06F 3/038* (2013.01)
USPC ......................................................... 345/173

(58) Field of Classification Search
CPC ... G06F 1/1626; G06F 3/0219; G06F 1/1656; G06F 1/1632; G06F 3/0213; G06F 3/0236; G06F 3/0338; G06F 1/1622; G06F 1/1641; G06F 1/1662; G06F 1/1664; G06F 1/1679; G06F 1/1681; G06F 1/1683
USPC .................................................. 345/168–172
See application file for complete search history.

(56) References Cited

U.S. PATENT DOCUMENTS

| 6,909,424 | B2 * | 6/2005 | Liebenow et al. | 345/169 |
| 7,953,448 | B2 * | 5/2011 | Pletikosa et al. | 345/168 |
| 2005/0104855 | A1 * | 5/2005 | Grossmeyer | 345/169 |
| 2007/0159466 | A1 * | 7/2007 | Kawell et al. | 345/169 |
| 2012/0044147 | A1 * | 2/2012 | Roka | 345/169 |

* cited by examiner

*Primary Examiner* — Srilakshmi K Kumar
*Assistant Examiner* — Damon Treitler

(57) ABSTRACT

A method and apparatus are provided for user input to a tablet computer. The apparatus consists of movable grips with touch sensitive regions attached to the sides of a tablet computer. Both the positions of the grips and the location of touches are used to determine the input codes sent to the computer.

24 Claims, 7 Drawing Sheets

TABLET COMPUTER INPUT DEVICE

CROSS REFERENCE TO RELATED APPLICATIONS

This non-provisional application claims priority to U.S. provisional application 61/410,357 filed on Nov. 5, 2010, which is incorporated herein by reference.

BACKGROUND OF THE INVENTION

1. Field of the Invention

This invention relates to a method of typing and pointing on a mobile computer.

2. Statement of the Problem

Typing on mobile devices is difficult. There are currently three primary approaches: requiring a horizontal surface for a keyboard such as on notebook and laptop computers, requiring a user to cradle a device in one hand while typing with the other such as on a tablet computer, or requiring a user to use thumbs while holding a device such as on a smart phone. These approaches either limit the environments where the device can be effectively used, present poor ergonomics, or slowdown input. Attempts to resolve these limitations have been tried by putting keys on the backside of a tablet computer. In these attempts, locating keys and accessing multiple rows is difficult.

SUMMARY OF THE SOLUTION

The present invention solves the above and other problems by adding grips to the sides of a tablet-like computer with touch sensitive areas positioned under thumbs on the front and side of the grips and under fingers on back of the grips. The grips either slide in and out or rock back and forth. Both the position of the grips and the location of activated touch areas are used to determine input codes sent to the attached computer.

Aspects

An aspect of the invention is how left and right grips move independently of one another and have touch sensitive areas, such as key switches.

Preferably, each grip has six keys on the back and two keys on the front and side. The six keys on the back are located to allow the index finger to access two keys, the middle and ring finger to access one key each, and the little finger to access two keys. The keys on the front and side are located to allow each thumb to access two keys.

Preferably, the grips allow for a back and forth rocking motion with multiple positions for each of the grips on either side.

Alternatively, the grips allow for an in and out sliding motion with multiple positions for each of the grips on either side.

Preferably, icons for all keys for all grip positions are displayed on the computer screen and the keys currently active based on the grips' current position are highlighted on the display.

Another aspect of the invention is how the grips' position, together with key press state, select a specific key code that is in turn communicated to the attached computer via industry standard keyboard protocols.

Another aspect of the invention is how the movement of the grips together with key press state can control pointing functions on the tablet computer via industry standard pointer protocols.

Another aspect of the invention is how keys on the grips are movable to be positioned for individual users based on hand sizes and preferences.

Another aspect of the invention is how the means for adding the grips to a separate tablet computer can also function as a protective case for said tablet computer.

DESCRIPTION OF THE DRAWINGS

The above and other advantages and features of the invention may be better understood from a reading of the detailed description taken in conjunction with the drawings. The same reference number represents the same element on all drawings.

DETAILED DESCRIPTION OF THE INVENTION

FIGS. 1-8 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
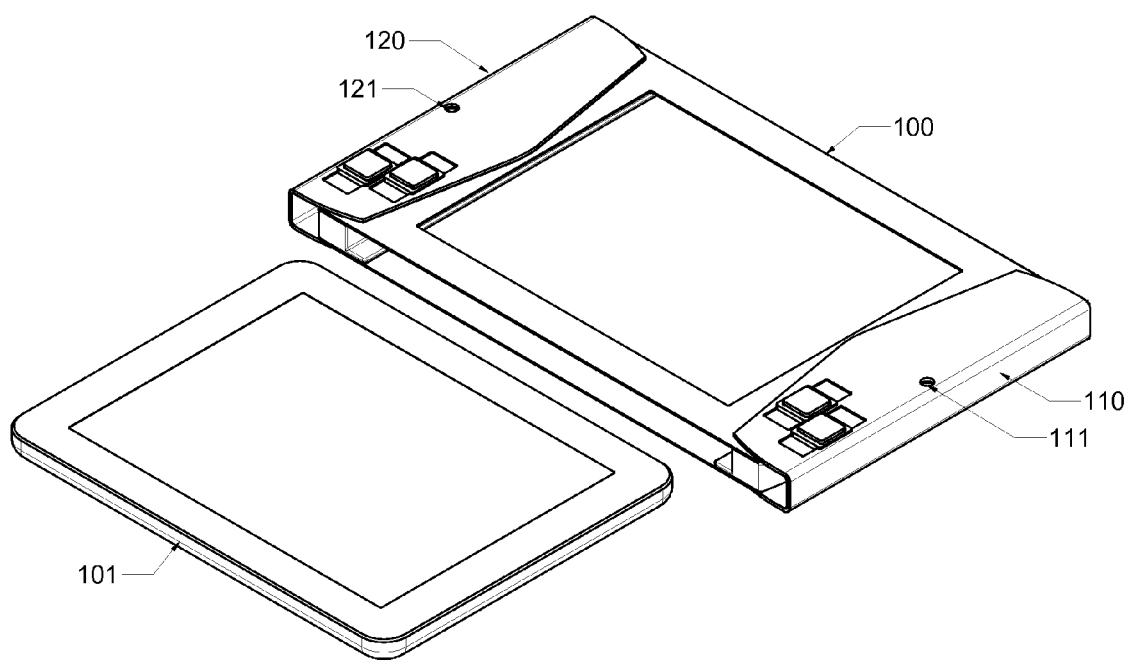
FIG. 1 is an isometric view showing an example of how a tablet computer is connected to and placed in the key case.

FIG. 1 shows a tablet computer case 100 that is designed to accept tablet computer 101. In addition to the normal components of a tablet computer case, case 100 has grips 110 and 120 mounted on the left and right sides of the case respectively. The grips 110 and 120 are mounted to case 100 at pivot points 111 and 121 respectively. These mounts allow grips 110 and 120 to rotate independently about these pivot points in both the clockwise and counter-clockwise direction. As drawn, both grips are able to rotate in both directions up to 10 degrees.

Figure 2:
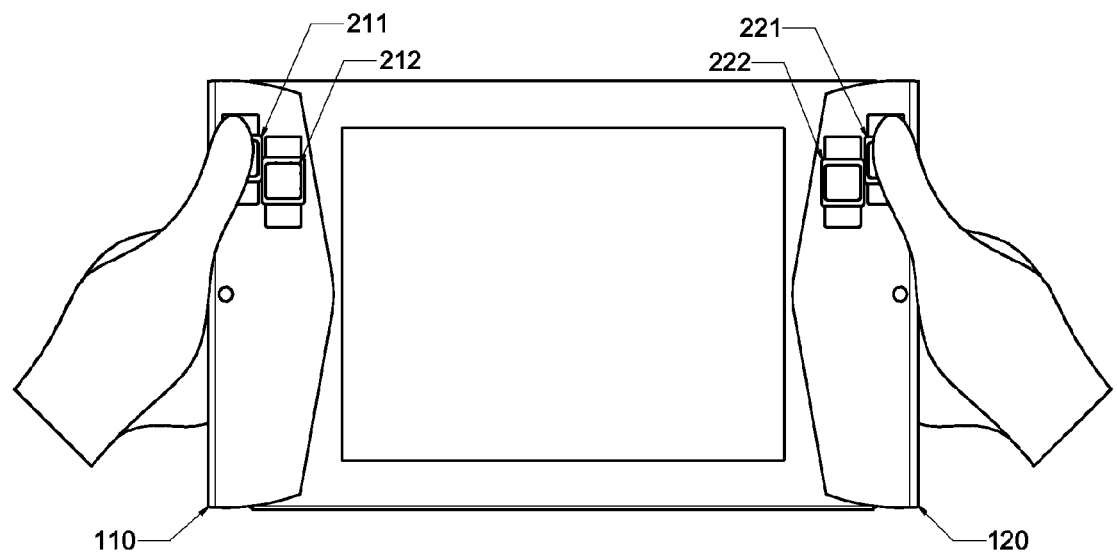
FIG. 2 is a front view of the key case being held by a user with the grips in the middle position and thumbs over the outer keys.

FIG. 2 shows key switches 211 and 212 mounted on the front face of grip 110 and key switches 221 and 222 mounted on the front of grip 120. A user's left hand holds grip 110 with the thumb over switch 211. Switch 212 is located to allow the left thumb to easily rotate to reach it without requiring any hand movement. Likewise, a user's right hand holds grip 120 and has easy access to switches 221 and 222.

Figure 3:
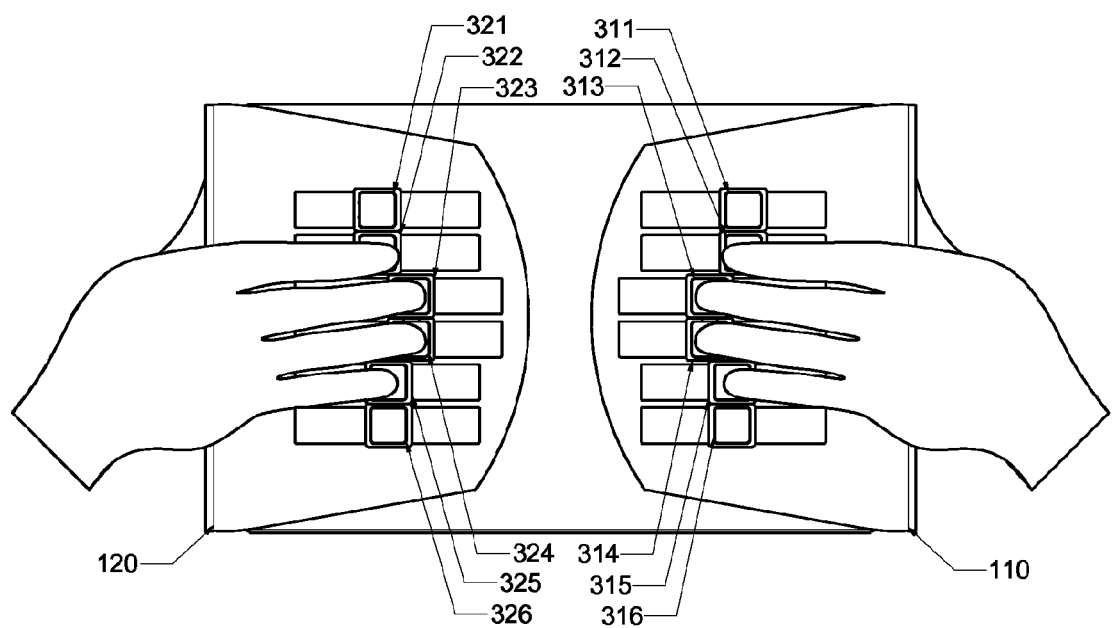
FIG. 3 is a back view of the key case being held by a user with the grips in the middle position and the fingers over the 4 middle keys.

FIG. 3 show shows the back side of the same user holding the same computer and case in the same manner. The fingers of the left hand (shown on the right in this perspective) are over switches 312 through 315. The index finger can rotate to access switch 311 and the little finger can rotate to access key 316 without requiring any hand movement. In a likewise manner, the fingers of a user's right hand can access switches 321 through 326.

All sixteen keys are mounted in slots within which they can slide. Thus the keys on the back of the grips can be slid in and out while the keys on the front of the grips can be slid up and down. The range of motion afforded the keys allow them to be positioned to accommodate the different hand sizes of different users.

Figure 4:
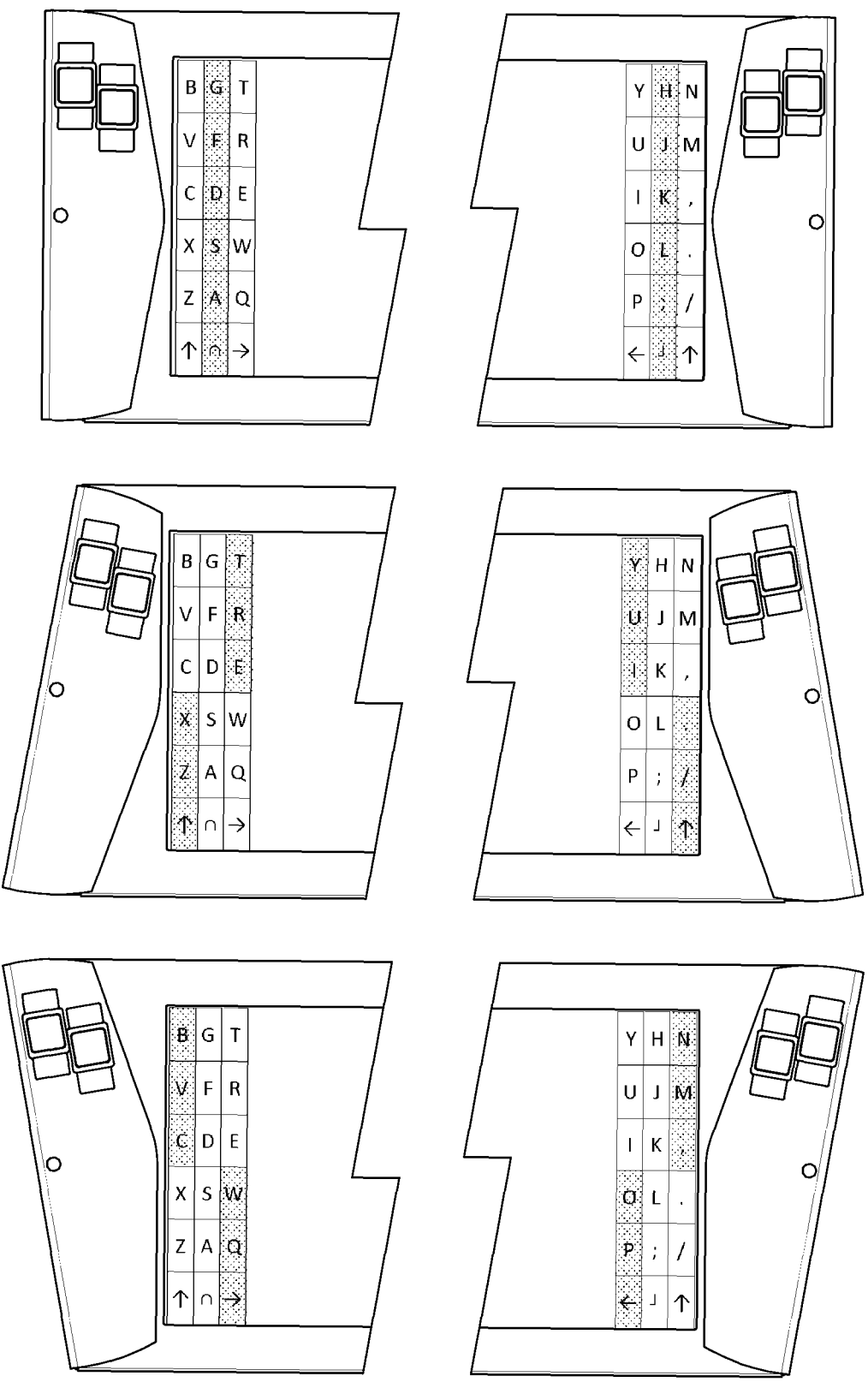
FIG. 4 is a front view of the key case with tablet computer showing the highlighted active keys when each of the left and right grips are in each of three positions.

FIG. 4 shows an example of how the selection of icons currently associated with the keys change based on grip position. In this example, the keys of a traditional QWERTY keyboard are broken into a left and right half, rotated, mirrored and placed along the sides. The keys in the three rows are reached by moving each of the grips in one of three positions.

Figure 5:
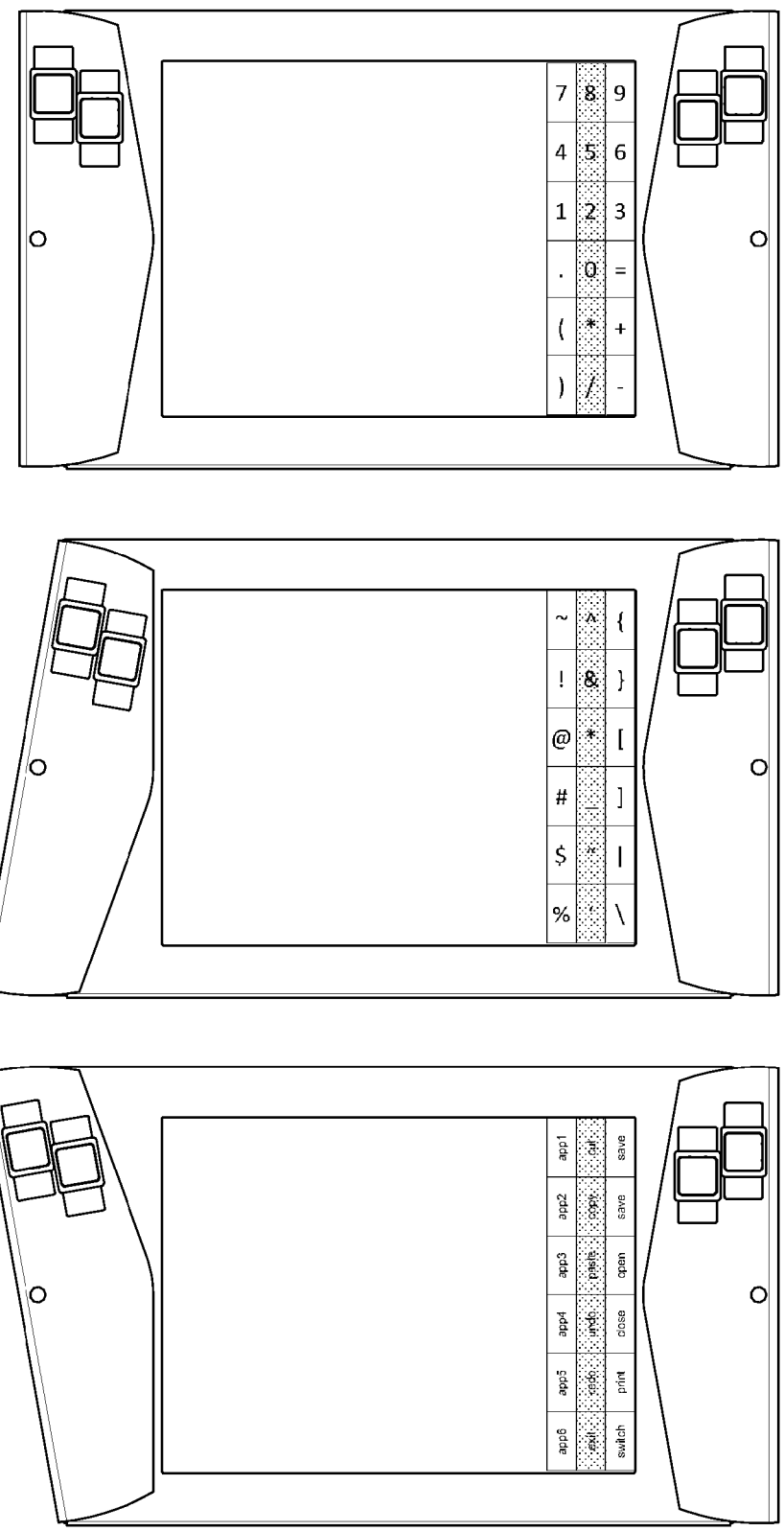
FIG. 5 is a front view of the key case with tablet computer showing alternate key icons for the right grip when the left grip inner thumb switch is pressed and the left grip is in each of three positions.

FIG. 5 shows how the displayed icons of the keys can change using grip positions and key combinations. In this example, the inner key of the left thumb selects alternate keys for the right hand. The right keys are a number set when the left grip is in the middle position, a symbol set when the top of the left grip is rotated in, and a control set when the top of left grip is rotated out.

The icons on the display associated with keys for the various grip positions can also change based upon the current computer context. When the computer is expecting keyboard input, the keys are assigned as discussed above. When the computer has no application running, the icons for the keys can show applications to launch. Or, when the computer is running a web browser, the keys can be associated to links on the web page.

Figure 6:
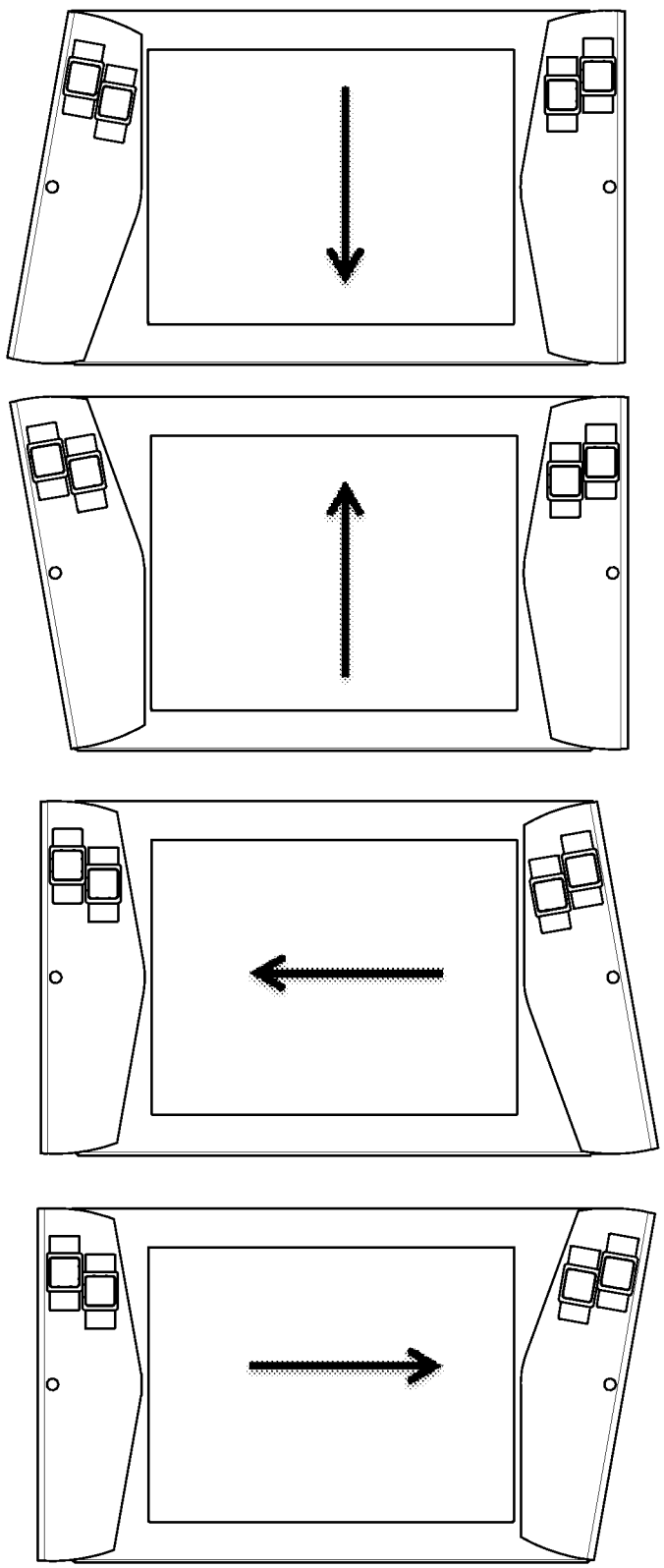
FIG. 6 is a front view of the key case with tablet computer showing pointer movement related to grip movement when the right grip inner thumb switch is pressed.
Figure 7:
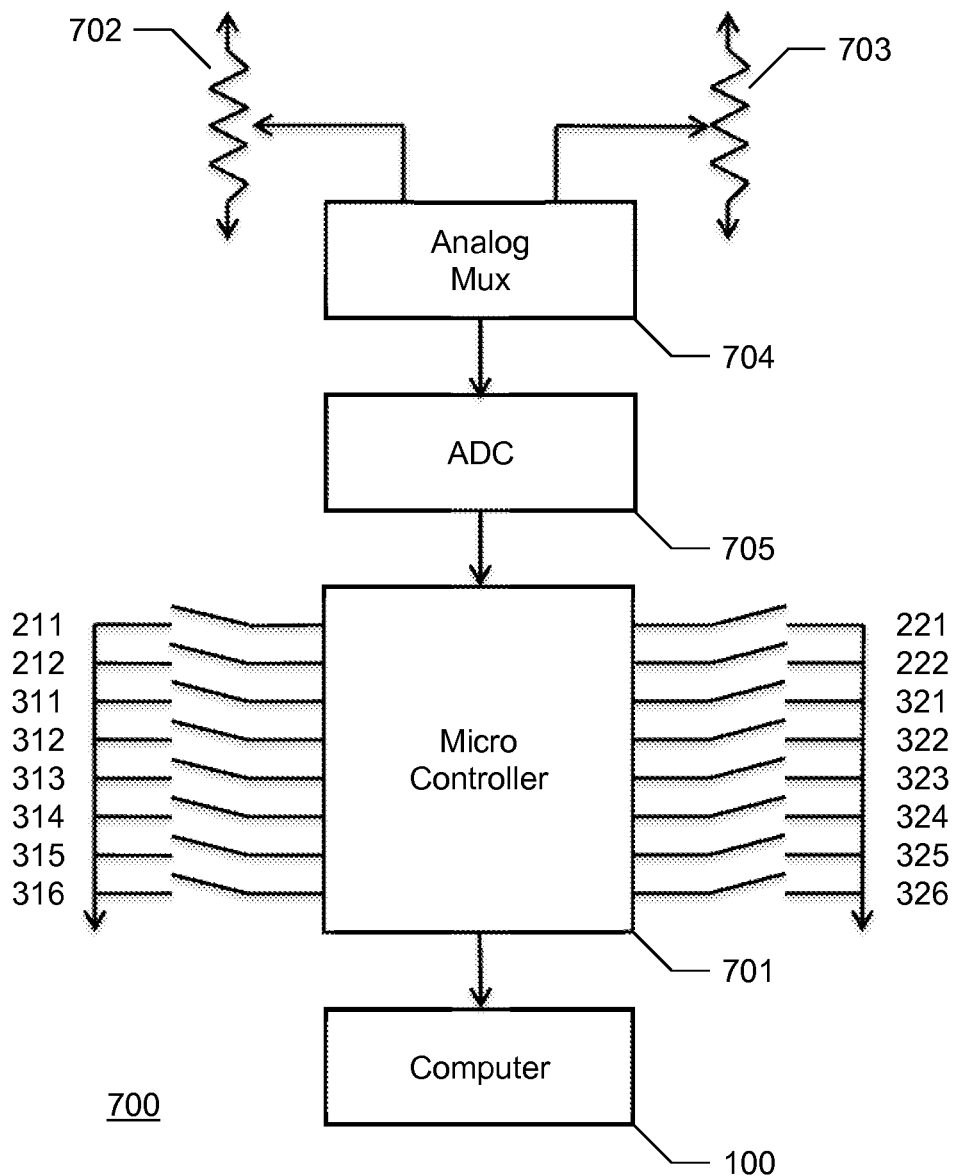
FIG. 7 is a schematic diagram of the electronics of the device.

FIG. 6 shows how the grip movement can be used to move a cursor on the display. In this example, holding down the inner key of the right thumb causes the device to send cursor location codes based on grip position. Rotating the top of the left grip in and out causes the cursor to move down and up respectively. Rotating the top of the right grip in and out causes the cursor to move left and right respectively. In this pointer mode, the function of the keys on the back of the grips change to mouse buttons FIG. 7 shows a schematic diagram of circuit 700 which is a possible implementation for the electronics of the invention. The core of the electronics is micro-controller 701. Micro-controller 701 is connected to computer 100 via communications channel 706. In a preferred embodiment, channel 706 is a USB connection. Key switches 211, 212, and 311 through 316 from the left grip, and 221, 222, and 321 through 326 from the right grip connect directly to micro-controller 701 where they are monitored for state changes. Potentiometer 702 is connected to the left grip such that the wiper of the potentiometer moves as the grip rotates. Likewise, potentiometer 703 is connected to the right grip such that its value depends of the right grip's position. The voltage on the wiper pins of potentiometers 702 and 703 are read by analog to digital converter 705 by way of analog multiplexor 704.

Figure 8:
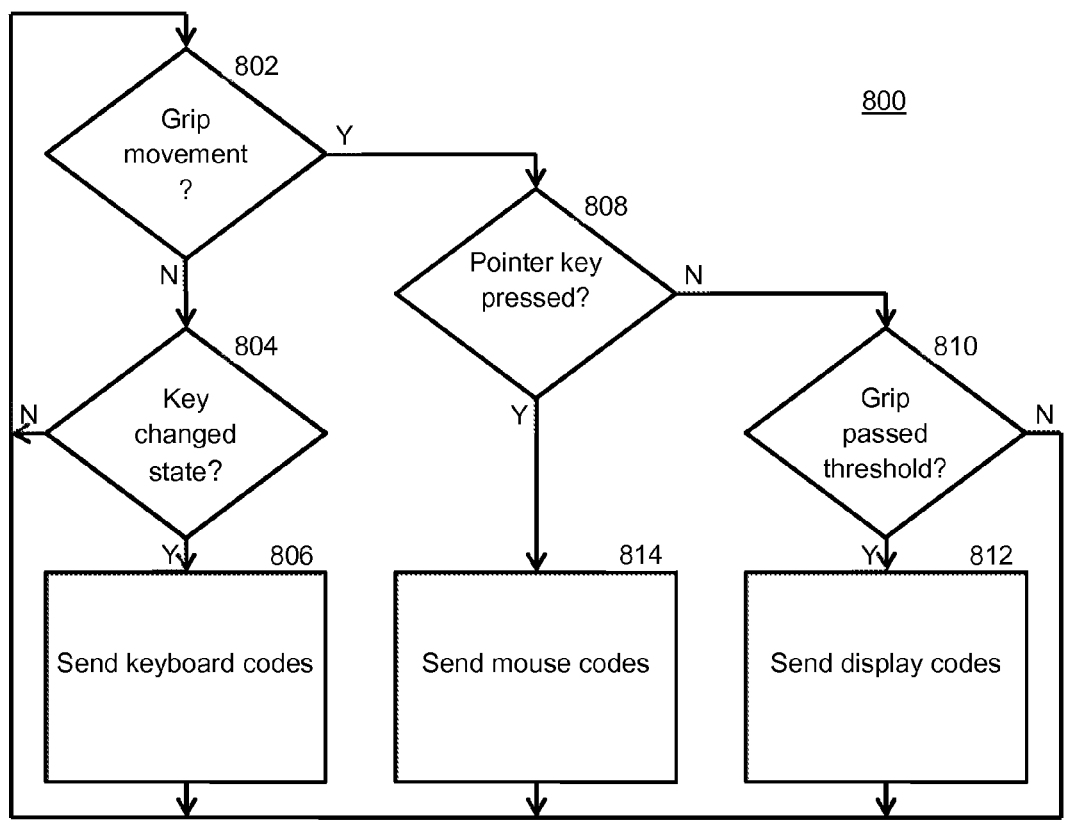
FIG. 8 is a flow chart of a method for determining which input codes to send to a tablet computer based on key states and grip positions.

FIG. 8 illustrates a flow chart of process 800 running on micro-controller 701 to monitor grip positions and switch states to determine input codes to send to computer 100. In step 802, micro-controller 701 determines if either grip has moved by reading potentiometers 702 and 703. If there was a change then processing continues at step 808, otherwise process 800 continues at step 804. In step 804, micro-controller 701 determines if there has been a change in the state of any of the keys. If there is no change then processing begins again at step 802, otherwise process 800 continues at step 806 where an input code based on the current position of the grips and the changed key state is determined and sent to computer 100. Process 800 then returns to step 802. In step 808, micro-controller 701 reads the state of the pointer key 212. If the pointer key is pressed, processing branches to step 814, otherwise processing continues at step 810. In step 814, the magnitude of the movement of the two grips is determined and pointer movement control data is calculated and sent the computer 100. Processing then returns to step 802. In step 810, the grip location is measured to determine if it moved enough to select a different set of keys. If not, processing returns to step 802. Otherwise processing continues in step 812 where a control code is sent to computer 100 instructing it to highlight the newly active set of icons. Processing then returns to step 802.

Although specific embodiments were described herein, the scope of the invention is not limited to those specific embodiments. The scope of the invention is defined by the following claims and any equivalents therein.

I claim:

1. A method for user input to a held computer using grips attached to the sides of the computer in a manner to allow for movement of the grips; with touch sensitive areas on the grips positioned under the user's fingers and thumb; with a controller able to read the positions of the grips and the status of the touch sensitive areas; where the position of the user's fingers and thumb stays fixed relative to the touch sensitive areas as the grips move responsive to movement of the user's hands; and where a subset of the key codes from a larger set of key codes are assigned to the touch sensitive areas by the controller; and where the subset of key codes currently assigned are selected by the controller based on the current position of the grips; and where the user selects a key code for the controller to send to the computer by pressing with the finger or thumb above the touch sensitive area currently assigned the desired key code among the currently available subset of key codes.

2. The method of claim 1, where the currently active set of key codes associated with the available touch regions is highlighted on the display of the attached computer.

3. The method of claim 1, where the grips are free to pivot in the plane of the display of the attached computer.

4. The method of claim 1, where the grips are free to slide in and out in the plane of the display of the attached computer.

5. The method of claim 1, where the touch sensitive areas are key switches.

6. The method of claim 1, where the touch sensitive areas are pressure sensitive multi-touch sensors.

7. The method of claim 5, with six switches on the back of each grip accessible by the four fingers of each hand.

8. The method of claim 5, with one or more switches on the front and side of each grip accessible by the thumbs of each hand.

9. The method of claim 5, where switches are moveable to accommodate user preferences.

10. The method of claim 1, where the sent input codes are compatible with those sent by a keyboard compatible with the attached computer.

11. The method of claim 1, where the sent input codes are compatible with those sent by a pointer device compatible with the attached computer.

12. The method of claim 1, where the means to attach grips to the computer is by attaching said grips to a case which in turn holds the computer.

13. An apparatus for user input to a held computer using grips attached to the sides of the computer in a manner to allow for movement of the grips; with touch sensitive areas on the grips positioned under the user's fingers and thumb; and with a controller in the apparatus able to read the positions of the grips and the status of the touch sensitive areas; and where the position of the user's fingers and thumb stays fixed relative to the touch sensitive areas as the grips move responsive to movement of the user's hands; and where a subset of the key codes from a larger set of key codes are assigned to the touch sensitive areas b the controller; and where the subset of key codes currently assigned are selected by the controller based on the position of the grips; and where the user selects a key code for the controller to send to the computer by pressing with the finger or thumb above the touch sensitive area currently assigned the desired key code among the currently available subset of key codes.

14. The apparatus of claim 13, where the currently active set of key codes associated with the available touch regions is highlighted on the display of the attached computer.

15. The apparatus of claim 13, where the grips are free to pivot in the plane of the display of the attached computer.

16. The apparatus of claim 13, where the grips are free to slide in and out in the plane of the display of the attached computer.

17. The apparatus of claim 13, where the touch sensitive areas are key switches.

18. The apparatus of claim 13, where the touch sensitive areas are pressure sensitive multi-touch sensors.

19. The apparatus of claim 17, with six switches on the back of each grip accessible by the four fingers of each hand.

20. The apparatus of claim 17, with one or more switches on the front and side of each grip accessible by the thumbs of each hand.

21. The apparatus of claim 17, where switches are moveable to accommodate user preferences.

22. The apparatus of claim 13, where the sent input codes are compatible with those sent by a keyboard compatible with the attached computer.

23. The apparatus of claim 13, where the sent input codes are compatible with those sent by a pointer device compatible with the attached computer.

24. The apparatus of claim 13, where the means to attach grips to the computer is by attaching said grips to a case which in turn holds the computer.

* * * * *